April 7, 1936.  W. LINTERN ET AL  2,036,485
VEHICLE BODY VENTILATOR
Filed Jan. 20, 1933  6 Sheets-Sheet 5

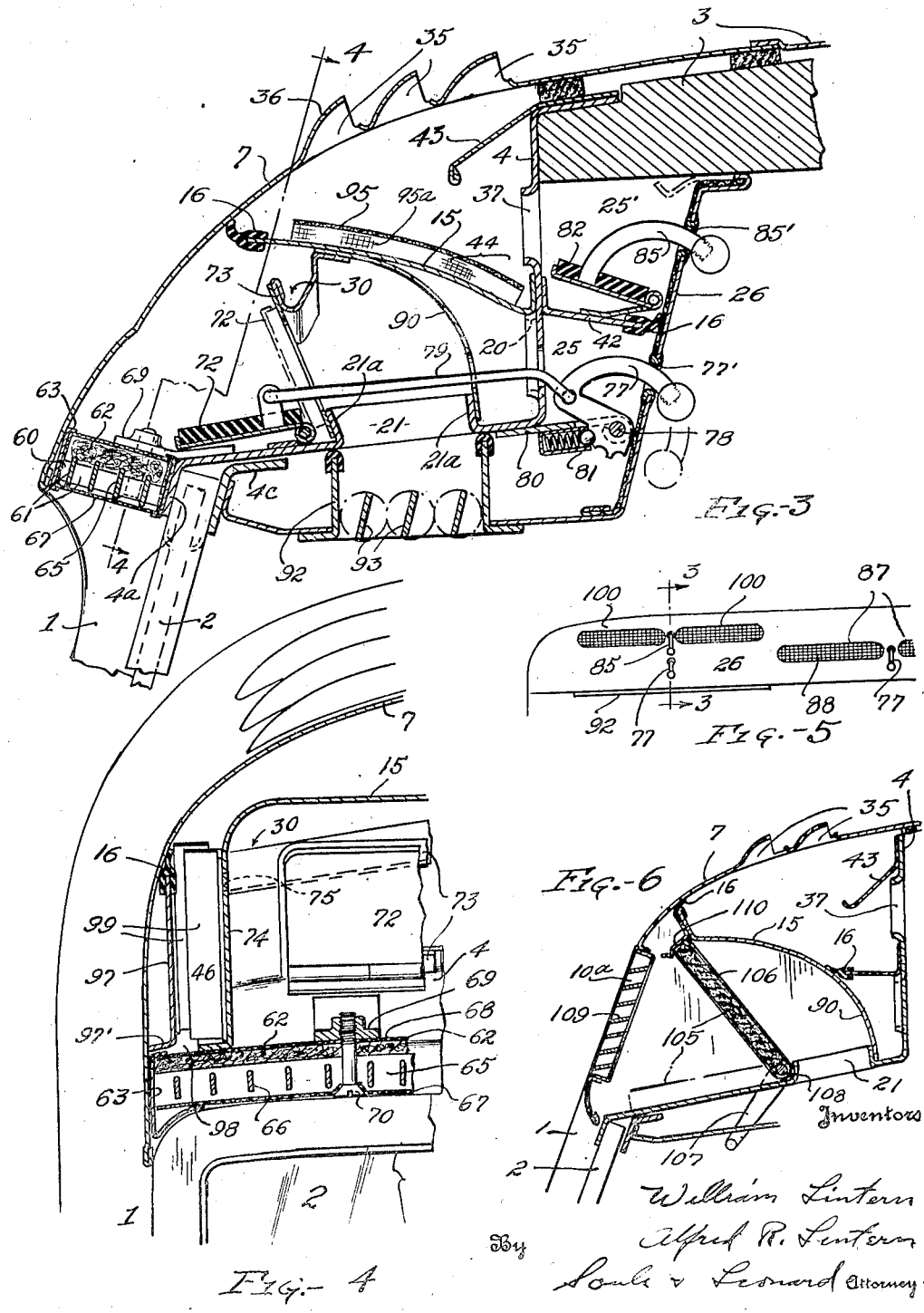

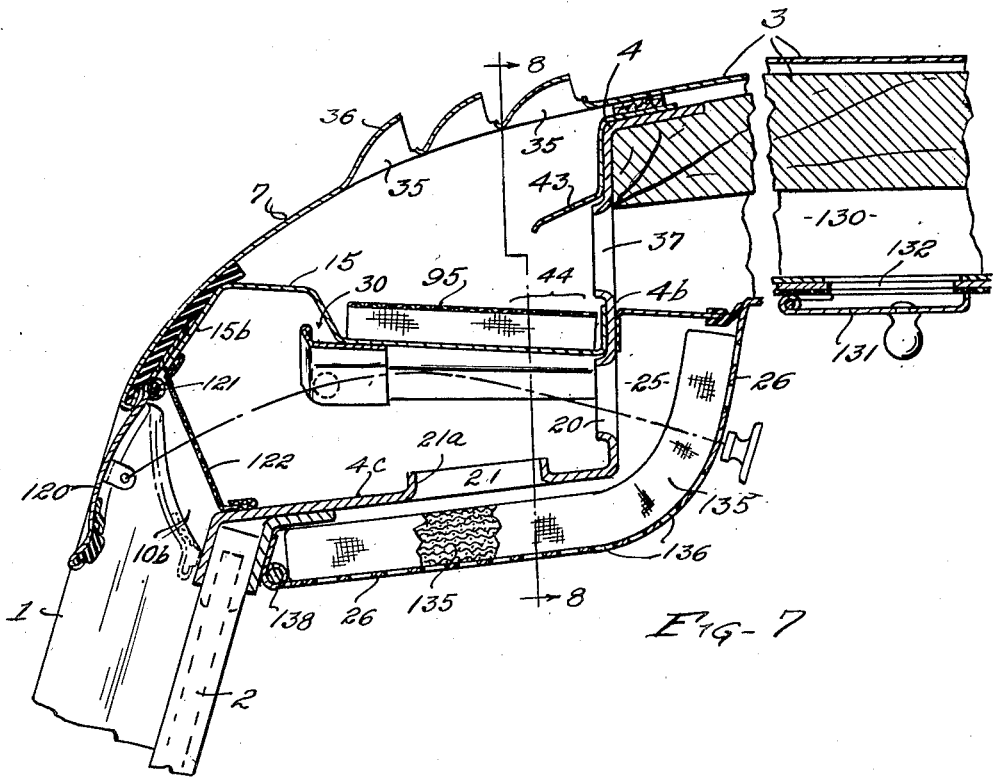
FIG-7
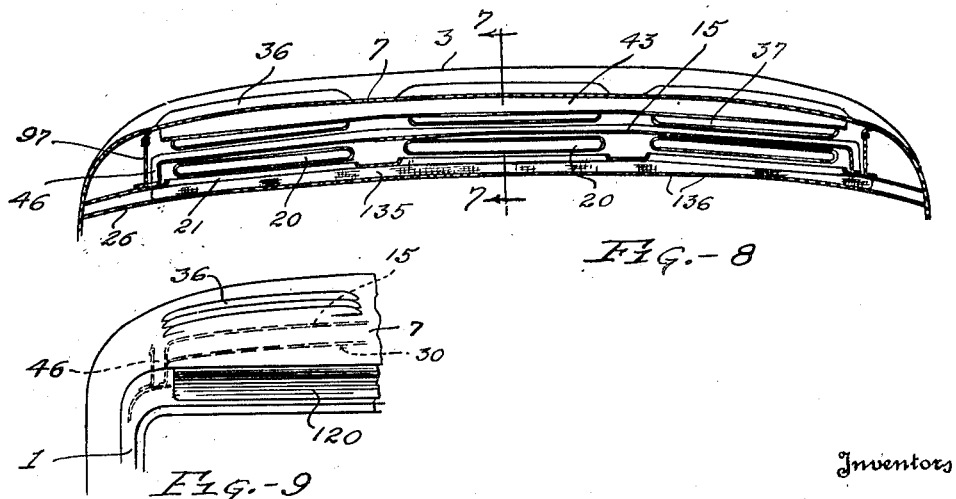
FIG.-8
FIG.-9

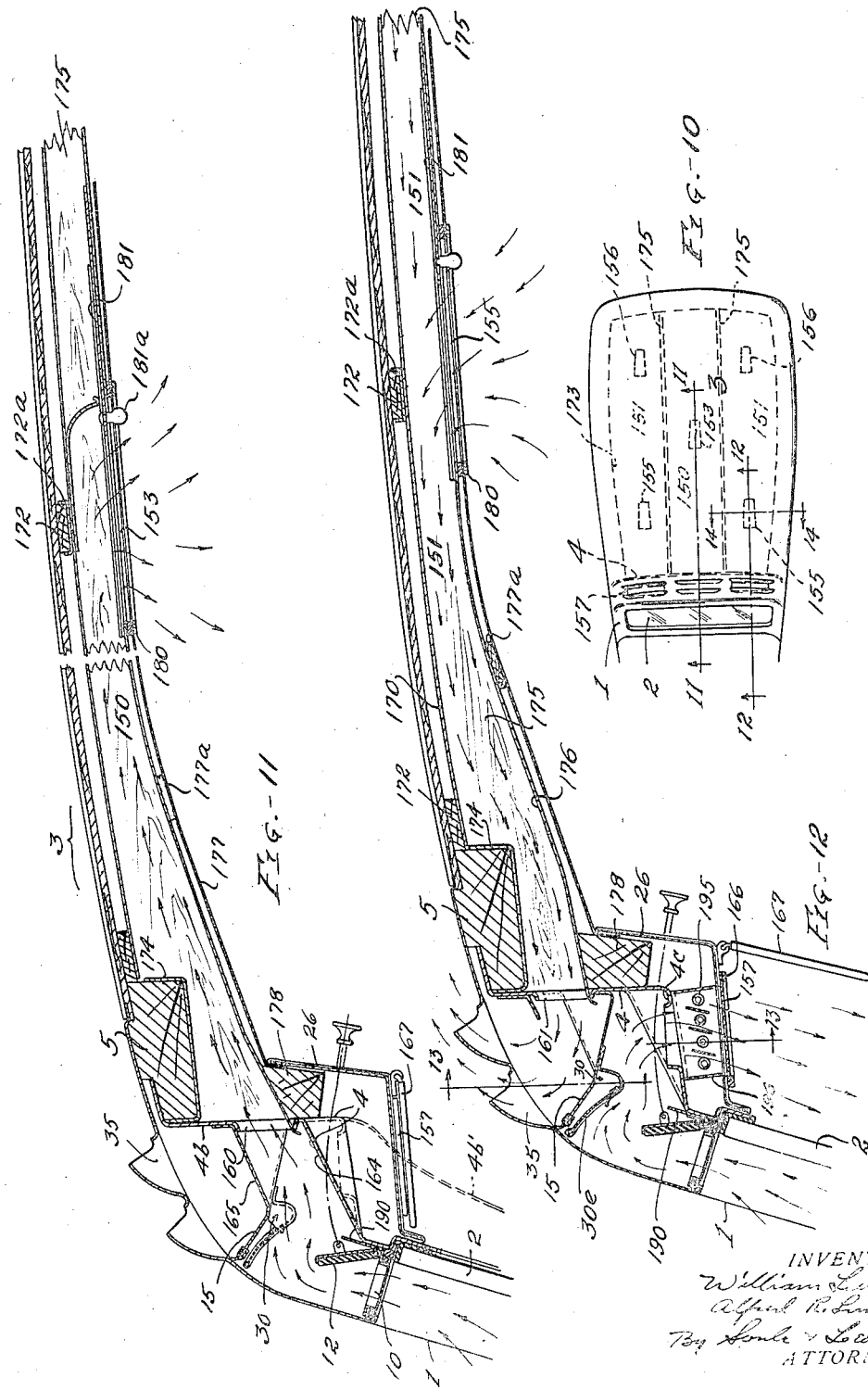

INVENTORS
William Lintern
Alfred R. Lintern
By Soule v Leonard ATTORNEYS

April 7, 1936.    W. LINTERN ET AL    2,036,485
VEHICLE BODY VENTILATOR
Filed Jan. 20, 1933    6 Sheets-Sheet 6

INVENTORS
William Lintern
Alfred R. Lintern
By Soule v Leonard ATTORNEYS

Patented Apr. 7, 1936

2,036,485

UNITED STATES PATENT OFFICE 2,036,485

VEHICLE BODY VENTILATOR

William Lintern and Alfred R. Lintern, Cleveland, Ohio

Application January 20, 1933, Serial No. 652,624

10 Claims. (Cl. 296—137)

This invention relates to vehicle body ventilating apparatus of the type shown in our prior application, Serial No. 578,710, filed December 3, 1931, Patent No. 1,969,934. The apparatus also includes principles of operation and apparatus which are disclosed and claimed in the patent to William Lintern, No. 1,862,058, issued June 7, 1932.

The objects include the following:

1. To simplify and reduce the cost of construction and installation of efficient all-weather injector and/or ejector ventilator apparatus for vehicle bodies, particularly of the closed type.

2. To provide a ventilating unit for a vehicle body which may be more economically installed, particularly as a "built-in" feature of the body.

3. To provide a simple and effective injector and/or ejector ventilator apparatus which will occupy a comparatively small space and more effectively employ parts of the body which are essential to the body construction as parts of the ventilator apparatus.

4. To provide an air injector which will function to supply air to the interior of a vehicle body in large volume and which will not detract in any way from the pleasing appearance of such body. 4—a. More specifically, to provide an air injector arrangement which will be relatively inconspicuous upon casual observation of the body. 4—b. Still more specifically, to provide an inconspicuous and efficient air injector for a vehicle body which is highly "stream-lined".

5. To provide improved weatherproofing means for injector and/or ejector ventilators for vehicle bodies.

6. To provide more effective arrangements for draining water from injector and/or ejector ventilators.

7. To provide various practical arrangements for cleaning air received into a vehicle body in comparatively large volume.

8. To provide an air injecting apparatus for vehicle bodies of the closed type including air cleaning means and more specifically air cleaning means so arranged as not to reduce the volume of air supplied to the interior of the vehicle body below a point affording complete comfort to the occupants of such body.

9. To provide for controlling the function of air cleaning media in an air injector for vehicle bodies in such manner that the cleaning media may be rendered inactive as desired to at times increase the volume of air supplied to the body.

10. To provide for reducing "wind-noise" in an injector ventilator for a vehicle body.

11. To provide an air injector by which adequate air for full aeration of the body space is supplied without unpleasant and deleterious drafts.

12. Provision of an efficient injector and/or ejector ventilator, the parts of which may be easily and quickly assembled and installed in a vehicle body without materially altering or weakening the construction of such body.

13. To more effectively use essential parts of an automobile body structure in the provision of an injector and/or ejector ventilator apparatus.

14. To provide an effective ventilator arrangement for a vehicle body of the closed type which arrangement will be substantially entirely contained in the header structure of the body without increasing or unduly increasing the size of or weakening such structure.

15. To provide for more effectively distributing injected air in a vehicle body in relation to effectively ejecting air therefrom.

16. To provide an improved method and apparatus for controlling the temperature of air in a vehicle body.

17. To provide adequate air change in a vehicle body—with or without temperature change—when the vehicle is not in motion.

In the drawings:

Fig. 3 is a view similar to Fig. 1 of a modified arrangement and is taken on the plane indicated by the line 3—3 of Fig. 5;

Fig. 4 is a detail transverse sectional view taken substantially along the line 4—4 on Fig. 3;

Fig. 5 is a fragmentary view showing substantially half of the front header panel of an automobile body and the relative position of the injector and ejector openings therethrough;

Fig. 6 is a view similar to Figs. 1 to 3 showing a still further modification;

Fig. 7 is a view similar to Figs. 1, 3 and 6 showing a still further modification;

Fig. 8 is a sectional view taken transversely of the vehicle body and substantially along the line 8—8 on Fig. 7;

Fig. 9 is a fragmentary front elevation of the upper portion of an automobile body incorporating the arrangements of Figs. 7 and 8;

Fig. 10 is a diagrammatic plan view showing a modified arrangement of injector and ejector outlet and inlet passages respectively between the interior of the body and suitable injector and ejector ducts;

Figure 13:
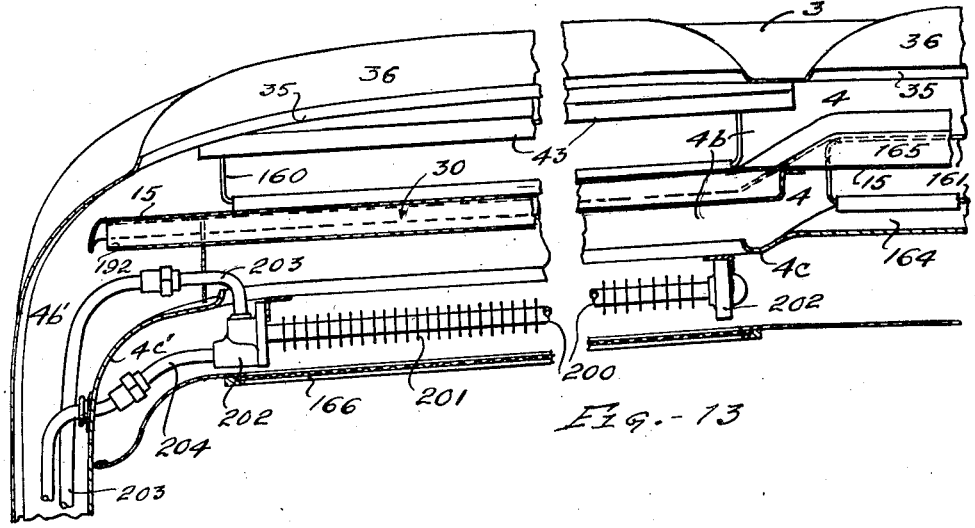
Figure 14:
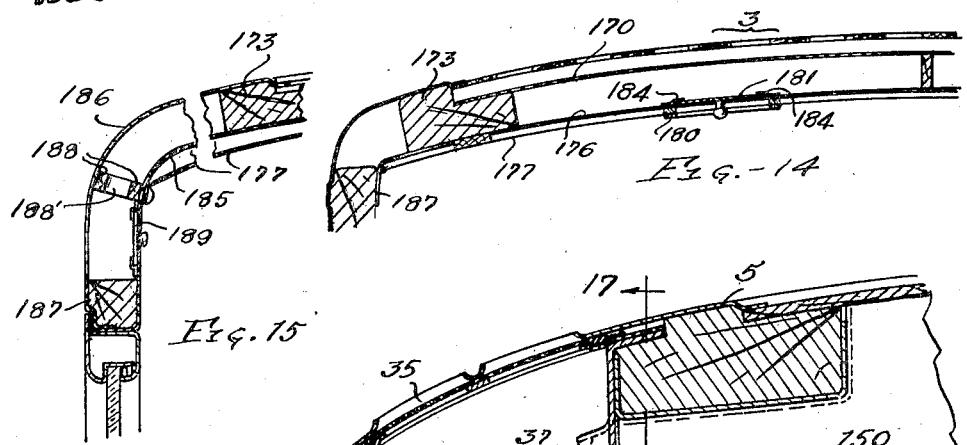
Figure 15:
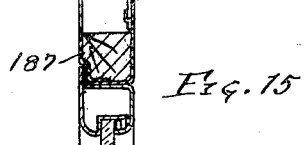
Figure 16:
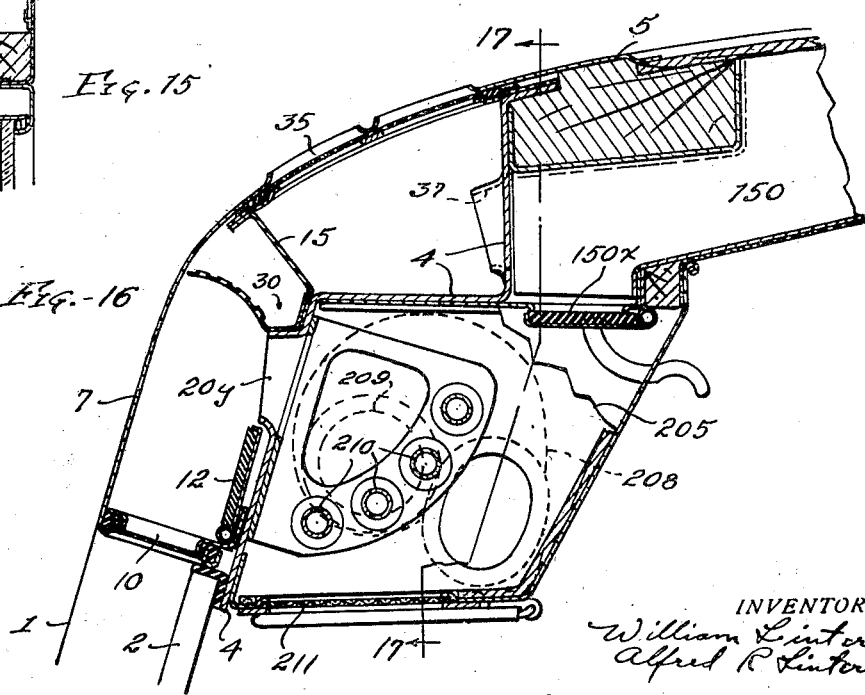
Figure 17:
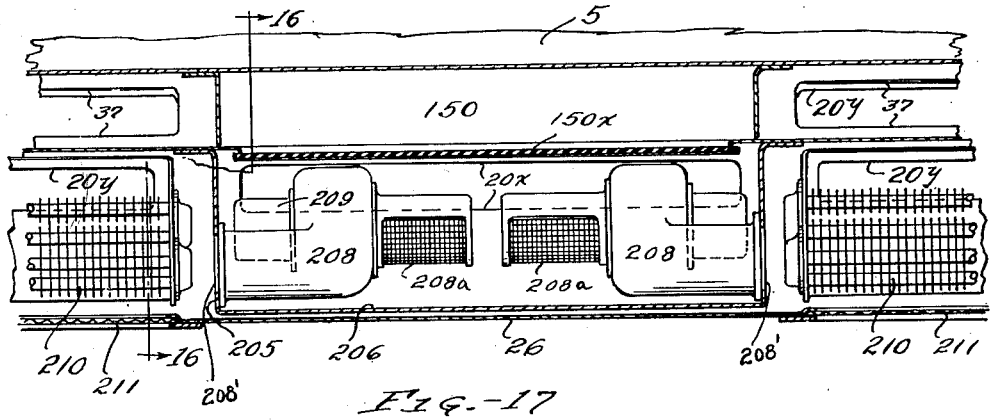
Figure 18:
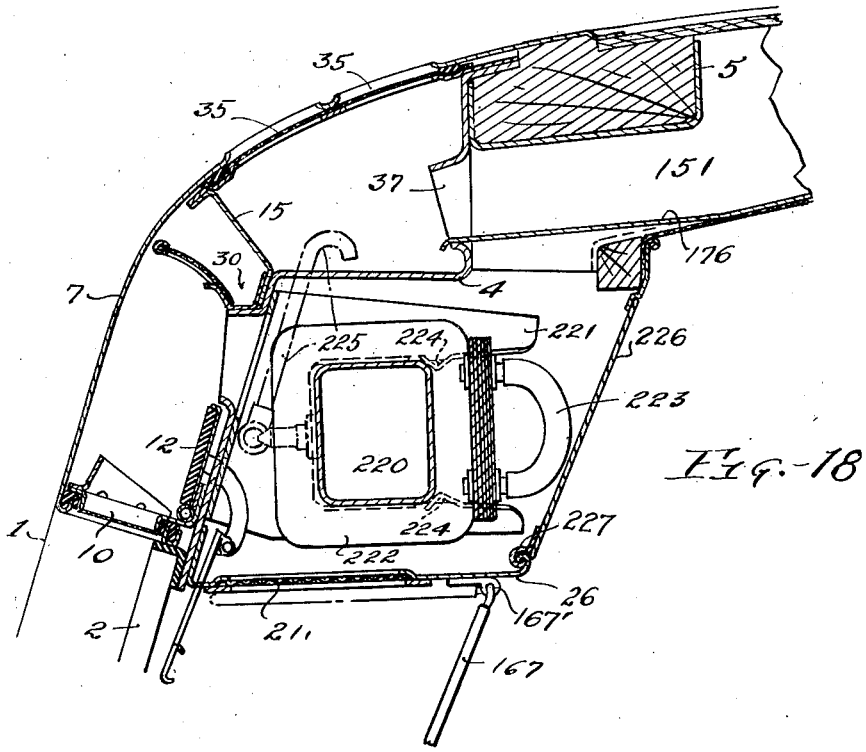

Figs. 11 and 12 are longitudinal sectional views taken substantially along the lines 11—11 and 12—12 on Fig. 10;

Figs. 13 and 14 are transverse sectional views taken substantially along the lines 13—13 and 14—14 on Figs. 12 and 10 respectively;

Fig. 15 is a view on the order of Fig. 14 but showing a different arrangement of air duct (for either injection or ejection);

Fig. 16 is a different arrangement of vehicle body hollow header modified principally to accommodate air conditioning apparatus, particularly mechanical air forcing means and air temperature changing means;

Fig. 17 is a transverse sectional view taken substantially along the line 17—17 on Fig. 16; and Fig. 18 is a view similar to Fig. 16 and showing particularly one form of cooling apparatus for air in the body.

Referring in detail to the drawings, 1 indicates the portion of the body front wall which forms the upright outer windshield frame. These are the usual forward vehicle body side frame posts. The windshield is shown in position between the posts 1 at 2. The roof or top wall structure of the body is shown generally at 3 and joining the roof structure and front wall framework, there is a hollow header structure including a header member 4 adapted to be made from pressed steel. The header member 4 connects a transverse wooden header member 5—usually present as part of the roof structure—with the front frame posts 1 in conventional fashion. The header member 4 is comparatively rigid by reason of various flanges thereon there being a substantially vertical portion 4b and substantially horizontal portion 4c and in addition a downwardly extending flange 4a behind the windshield and a rearwardly extending flange 4d at the upper margin of the portion 4b. This header member 4 may be made an essential portion of the ventilator as in the embodiments shown in all figures hereof. The ends of the header may curve downwardly at the body sides and may be suitably rigidly secured to the side posts.

Figure 1:
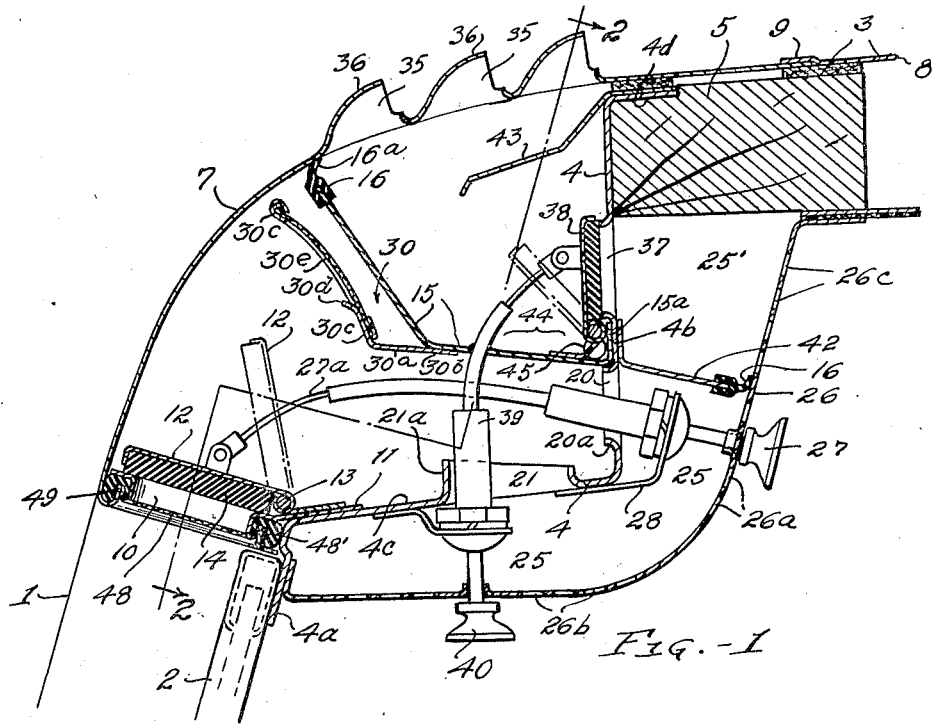
Fig. 1 is a fragmentary sectional view taken longitudinally of the vehicle body and showing the upper and forward portion (the header portion) of an automobile body incorporating one form of the invention.

Additionally connecting the front wall structure with the roof structure 3 and forming an outer wall of the hollow header structure there is an outer header member 7. This, it is understood, is referred to in automobile body building as the top roof panel. The panel 7 overhangs the upper margin of the windshield and extends rearwardly over the windshield and the rearwardly extending portion has air inlet passages 10 communicating the interior of the hollow header with the outside air. The outer and forwardly facing surface of the panel as shown in Fig. 1 lies in the plane defined by the foremost surfaces of the side frame posts and curves upwardly and rearwardly, the rear margin of the panel 7 resting on and being suitably secured to the roof structure. For example, the panel 7 may overlie and rest on the wooden header 5 and be suitably joined to a top cover member 8 as at 9.

It will be noted that by reason of the windshield being set back of the foremost surface of the side frame posts 1 (a distance substantially equal to the effective width—narrow dimensions—of the openings 10, as shown) a very definite air stream guiding channel is formed between the windshield and side frame posts 1 which channel empties air upwardly directly into the injector openings. Thus the injector requires no conspicuous deflector such as prehensile lip or scoop protruding from the body forwardly.

The inner surfaces of the top roof panel 7 define portions of both air injector and air ejector ducts as illustrated in all figures. The injector will now be described.

The injector inlet passages 10 are formed in part by a plate 11 which at its rear edge overlies the horizontal portion 4c of the header and is secured thereto in any convenient fashion. The plate is flanged downwardly to form the actual air receiving openings 10, there being three of these openings in the present embodiment, two only being shown (see Fig. 2). The openings 10 are preferably closed by pivoted injector control doors or shutters, these being shown at 12, hinged rearwardly from the openings as at 13 and provided with suitable sealing material such as strips of fairly compact sponge rubber 14.

The upper wall of the injector duct is formed by a sheet metal member 15 which divides the injector duct from the ejector duct portions of the header structure. This member 15 will be hereinafter referred to, in connection with all forms shown, as a divider. The divider may be secured as by a flange 15a to the vertical portion 4b of the header member 4, and is provided at its forward and upward edges with suitable sealing material such as an extruded sponge rubber strip 16 having body portions formed to embrace both edges of the divider and a flexible rib 16a adapted to yieldingly bridge the gap between the divider and the top roof panel 7 and form an effective seal to isolate the injector duct from the ejector duct.

Completing the injector insofar as the space between the header member 4 and top roof panel 7 is concerned there are end walls 18 (see Fig. 2) also flanged as at 18a and 18b, the flanges being respectively secured to the vertical and substantially horizontal portions of the header. The upper and forward edges of the end wall members 18 are also provided with sealing strips 16 which continuously engage the inner surfaces of the top roof panel to form an effective seal. At the vertical and horizontally disposed portions of the header are air passage openings 20 and 21, preferably strengthened by flanging the metal inwardly as at 20a and 21a, continuously about each opening. These openings as shown are arranged in common vertical planes—longitudinally of the vehicle body—so that part of the air received into the duct above described is diverted rearwardly through the header 4 and part downwardly therethrough. Any suitable additional control arrangements may be provided in the openings 20 and 21 so that the air received in the injector may all be directed over the heads of the front seat passengers toward the rear of the body or so that all of the air can be directed downwardly in front of such front seat passengers. Such individual controls however are not shown in Figs. 1 and 2.

Air from the openings 20 and 21 flows into a space 25 provided between the header and a front header panel 26 shown as provided with suitable apertures 26a for carrying the air received through the openings 20 rearwardly in the car and with similar suitable apertures 26b for carrying the air downwardly from the openings 21.

Control of the doors or shutters 12 is effected as shown by suitable knobs 27 of the usual dash control assemblies, the knobs being provided with suitable flexible rods or wires 27a connected in suitable fashion to the doors 12. The dash control assemblies illustrated are supported by brackets 28 preferably secured to the under side of the header member 4.

It will be seen that when the buttons are withdrawn by the driver or passenger from the position shown in Fig. 1 the doors or shutters 12 are raised—as to the broken line position indicated in Fig. 1—whereupon a portion of the air under high pressure rising from the windshield is diverted into the openings 10 and is swirled rapidly into the upper portion of the air duct formed between the members 7 and 15. Any moisture that may be suspended in such air will be thrown violently against the substantially horizontal surface 4c of the header and forwardly from the flanges 21a about the openings 21. Such precipitated moisture drains out of the opening 10 due to the watershed effects of the wall portion 4c and the flange or walls 21a prevent such water from entering the car body. The flanges of the openings 20 extend a sufficient distance above the substantially horizontal wall portion 4c of the header to prevent accumulation of water on said wall portion from entering the body through the openings 20.

It is to be understood that during very bad weather the doors or shutters 12 will be opened less than to the full open position indicated in Fig. 1, thus decreasing the effective size of the passage defined by the doors and front panel. This decrease in size of the effective opening is, of course, accompanied by an increase in the velocity of the air passing the edge of the door and a concurrent increase in the swirling motion of the air so as to more effectively separate suspended moisture from the incoming air stream. During passage of the air stream around the upper edge of the door 12 the suspended moisture is thrown outwardly by centrifugal force against the top roof panel and then as the air stream progresses through the injector duct any substantial amount of moisture remaining is thrown against the wall 15 which in turn deflects the air containing such moisture on to the surface of 4c. The moisture collecting on the front roof panel readily drains to the forward part of the injector opening 10. Such moisture as may collect on the forwardly facing surface of the divider 15 would tend to drain downwardly and rearwardly (being urged by incoming air) and to prevent such drainage the collected moisture may be carried along the duct—laterally of the vehicle body—by suitable trough effects (see 30) on the divider 15. These may comprise suitably formed strips of sheet metal rigidly secured to the under side of the divider 15 and inclining downwardly both ways from vertical planes cutting the openings 10 centrally thereof, or the trough effect may be continuous and coextensive with the divider 15 for lateral discharge of accumulated moisture into main drain ducts (46, Fig. 2) disposed at the sides of the header structure as will be hereinafter shown. One manner of forming the trough effect in connection with the upwardly extending portion of the divider 15 is to attach a strip of sheet metal 30a to the under side of the divider as at 30b, the strip having an upstanding flange at 30c generally parallel to the upwardly extending portion of the divider 15 as shown. The effective upper and forward edge of the trough is indicated at 30d but above this a suitable metal screen 30e may be mounted adjacent an opening through the upstanding flange portion, which screen acts as a collecter for water in the form of small drops, discharging such water into the trough effect by gravity as will be obvious from Fig. 1. The trough effects may be continued to the end walls of the duct,—wall 18, Fig. 2—through which the water collected in the trough may be discharged by suitable openings (not shown) in the wall 18; (cf. 75 Fig. 4). Since the troughs 30 slope downwardly from their mid portions to their respective ends and since they intercept the air current passing downwardly along the divider 15 a comparatively high atmospheric pressure is built up in such troughs which forces the water entrapped therein along the troughs outwardly from their respective mid portions to their ends, at which latter points it is discharged out of the general air stream as above mentioned.

The ejector will now be described.

As set forth in the above identified Lintern patent and pending application, the air under high pressure rising from the windshield and front wall of the body generally, including the forwardly facing portion of the top roof panel 7, creates an exceedingly low air pressure area behind the effective upper limit of such front wall. Thus the mere provision of suitable openings in the forward portion of the top wall and suitable air ducts to the body space provide an excellent air ejector to maintain circulation of air in the body in conjunction with the injector above described and to rapidly exhaust foul air from the body. Such suitable ejector openings are shown at 35 in the top roof panel and these are preferably guarded by decorative louvers 36. The louvers guard the ejector duct against receiving larger pieces of foreign matter from the air. The assistance rendered by the louvers in the air ejecting action is believed inconsiderable as experience has demonstrated that the openings without louvers appear to be more effective in ejecting air in large volume.

The lower wall of the ejector duct is formed by the divider 15 previously described and the end walls are formed by continuations of the end walls 18 upwardly past the divider 15 to the top roof panel. The ejector openings in the header are illustrated at 37 and these may be individually closed by doors or shutters 38, hinged adjacent the lower edges of the openings to the header or to the divider 15 as desired. As shown the doors swing forwardly toward the top roof panel 7. A suitable control arrangement for the doors or shutters 38 may comprise the dash control assembly 39 which is similar to that employed for the injector doors or shutters 12. One of the control knobs for the ejector control is indicated at 40.

The front header panel is apertured as at 26c to provide entrance from the general vehicle body space to the space between the front header panel and the header member 4 and this latter space is divided by a suitable wall member 42. The wall 42 is coextensive with the panel and may be secured to the rear side of the header 4. The unattached edge may be sealed against the front header panel as by rubber strips 16.

When the doors 38 are swung down to the broken line position illustrated in Fig. 1, air passes freely through the openings 26c into the space 25' and thence through the openings 37 to the ejector openings 35 in the top roof panel. A suitable continuous watershed formation 43 is preferably provided above the doors 38 to carry water which may enter the ejector openings entirely clear of the openings 37. Water accumulating on top of the member 43 drains on to the divider and is carried to the sides of the ventilator in the trough effect shown at 44 between the divider 15 and vertical portion of the header member 4. One of the drain ducts which carry the accumulation of water from the ejector is illustrated at 46 in Fig. 2. Drain openings 45 lead from the trough effect 44, into the ducts 46 which in turn communicate wth special drain openings 46′ positioned beyond the injector openings 10 laterally of the vehicle body. These openings 46′ may be heavily screened as at 47 in order that very little air will be allowed to enter the tubes 46 and openings 45. If desired any suitable check valve arrangement may be provided to positively prevent injection of air through the drain openings into the ejector passages; or baffles may be used, Fig. 2.

It is to be understood that the ejector duct may be continued any suitable distance rearwardly of the car body in order that air may be discharged from the body at any desired point. For example, suitable individually controlled branch ducts (not shown in Fig. 1, but see Fig. 7) may be disposed say within the roof structure to communicate with the space 25′ of the ejector duct.

Practically all of the equipment necessary to provide the present ventilator is assembled on to the header 4 which, in one form or another, has an essential counterpart in all modern automobile bodies of the closed type. The dividers 15 and 42 may be spot-welded or bolted to the vertical portion of the header member 4 between the openings 20 and 37 and likewise the doors or shutters 12 and 38 may be secured to the header and divider 15 (by spot-welding at the flanges or bolting). The plate 11 in which the inlet passages 10 are formed may be secured to the header member 4 simultaneously with securing the hinges for the doors 12. To seal the joint between the plate 11 and the lowermost portions of the top roof panel we preferably flange the lower and inwardly extending portion of the top roof panel upwardly so as to telescope with the downwardly extending flanges defining the openings 10.

Essentially the same arrangement is used to seal the top roof panel against the plate 11 at the drain openings 46. Suitable guarding screen sections 48 are embraced between the flanges of the top roof panel and the flanges about the openings 10 and to hold the screen in place as well as to seal the joint between the various flanges we may provide substantially continuous strips of fairly dense sponge rubber at 49 having portions which entirely embrace a doubled portion 48′ of the screen where these doubled portions lie against the inner and outer surfaces of the top roof panel flanges. The screen and strips of rubber are preferably first assembled on to the flanges of the top roof panel and the forward portion of the top roof panel is brought up against the plate 11 into the final position and the upper and rearmost portions of the top roof panel are then swung down into engagement with the upper portion of the header and the usual transverse wooden bar 5 and secured in place. The ends of the panel 7 may as is usual be welded to outer portions of the body side posts 1 or cover members therefor.

Figure 2:
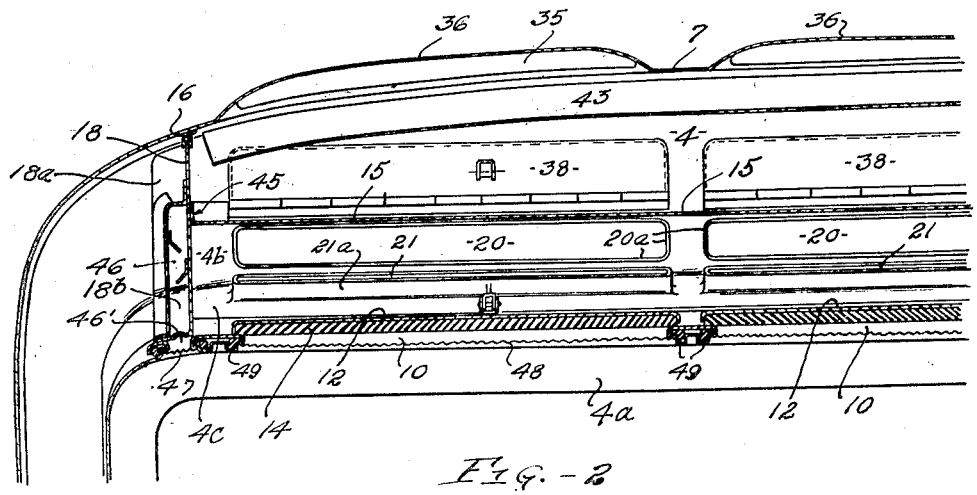
Fig. 2 is a fragmentary sectional view taken substantially along the line 2—2 on Fig. 1 and showing the details of construction of the arrangement of Fig. 1.

Referring to Figs. 3 to 5 the parts that are essentially similar to those of Figs. 1 and 2 are similarly numbered and only the differences will be described in detail. An important difference between the Fig. 1 arrangement and the Fig. 3 arrangement is that in Fig. 3 an air filtering and wind-noise reducing medium is illustrated at the entrance passage to the injector. Further, the control arrangement for the injector is modified to the extent that air may be selectively diverted downwardly and rearwardly in the car by the use of the injector, there being separate controls for these two operations. Other structural differences will be set forth below.

The air treating arrangement of Fig. 3 comprises an air filtering unit 60 including a sheet metal grill structure 61 and body 62 of air filtering material supported thereby. The grill and body of filtering material may be contained by a suitable shell 63—say sheet metal—. The grill may comprise spaced strips of sheet metal indicated at 65 extending laterally of the vehicle body and perforated to snugly receive short sheet metal bars 66, see Fig. 4.

The body of air filtering material may comprise metal wool and this may be suitably treated as by oiling to enable the same to collect dust, e. g. from the air. The grill structure is preferably protected at the injector opening against entrance of large foreign matter into the spaces between the sheet metal strips and bars—note screen at 67—, and the body 62 may be held in position by a suitable screen at 68, both screens being maintained in position by the sheet metal outer frame 63.

The unit 60 may be removably supported in the injector opening or openings on suitable brackets 69 supported on the generally horizontal and forward portion of the header member 4, and, as shown, the unit 60 is perforated to receive attaching screws 70 which pass through the unit and are in suitably threaded connection with the brackets 69.

Instead of closing the injector ducts at the forward or outer ends thereof as in Fig. 1, a controlling injector duct closure device is provided between the outer and inner ends of the injector ducts. This controlling closure as shown comprises a suitable number of doors or shutters 72 (one only being shown) hinged to the generally horizontal portion of the header 4 and arranged to swing from the open position shown in Fig. 3 to a closed position, (shown in broken lines) across an open framework 73. As shown this framework is supported at its lower edge by the forward flanges 21a of the header openings 20 and at its upper edge by a trough arrangement 30 similar to that shown in Fig. 1. The trough arrangement (see Fig. 4) discharges near the side portions of the body top structure and the ends of the trough are inclined downwardly (see Fig. 4) to discharge through the end walls 74 of the injector duct, at suitable openings 75 into the drain ducts 46.

It is desirable that the controls for both the injector and ejector apparatus be located on the upright portion of the front header panel. A suitable arrangement for this is shown particularly in Figs. 3 and 5, wherein it will be seen that the injector control doors or shutters are positioned by individual bent lever arms 77 carried on individual shafts 78 and connected to the doors or shutters through suitable linkage 79. The lever arm shafts 78 may be carried on suitable brackets 80 supported on the header member 4 and the levers may be held in various positions by suitable detents such as the conventional spring and ball devices, one being shown at 81.

Fig. 3, suspended from the bracket 80. The ejector doors or shutters 82 are as shown hinged to the divider 42. Curved arms are provided as at 85 for the ejector doors or shutters and both the arms 77 and 85 may project through suitable respective openings 77' and 85' in the front header panel and both sets of arms may have suitable knobs.

A further refinement of the ejector includes the provision of a splash screen 95 shown as an inverted channel of suitable metal screen with vertical portions 95a resting on the divider 15 thus holding the main body of the screen in spaced relation to the divider. During storms a considerable volume of water may be received through the ejector openings 35 and such water will be prevented from splashing through the ejector openings 37 in the header member 4 by being caught by the screening.

Water collected in the ejector duct forwardly of the header member 4 is conveyed laterally of the vehicle body in the trough effect 44, as in the previously described arrangement, and discharges into the downwardly extending drain ducts 46 at the sides of the body. These ducts (only one being shown) are formed by the walls 74 previously referred to and vertical wall members 97 secured to the header as by suitable flanges 97'. The duct effects thus formed discharge water through end portions of the unit 60 as at 98. To prevent these drain passages from operating as injectors and thus decreasing the effect of the ejector by supplying the ejector duct directly with injected air, a suitable arrangement of baffles 99 may be provided in each drain duct. These may overlap each other from opposite sides of the drain duct so as to form considerable resistance to the passage of air through the drain duct while allowing comparatively free discharge of water to the end portions of the injector opening.

Referring again to the injector duct it will be seen that in Fig. 5 provision is made whereby substantially the entire supply of air from say the central one of three door frames 73, which air is passed through openings 20, see Fig. 3, in the header member 4, may be diverted rearwardly through suitable openings such as 87 in the front header panel while the supply from the extreme frames 73, which air is passed through the header openings 21, (Fig. 3) may be diverted downwardly forwardly of the front seat passengers. The inner surfaces of the front header panel may support suitable screen or grillwork such as shown at 88 to allow free passage of air through the front header panel while concealing the inner parts of the ventilator. Control of the direction of air flow from the extreme frames 73 downwardly may be accomplished by the provision of respective deflecting walls at 90 secured to the dividing wall 15 at its upper edge and to the generally horizontal portion of the header 4 at its lower edge. Such deflector is omitted opposite the openings 87 and the duct is suitably partitioned by transverse walls to prevent flow of air from the extreme frames 73 to the openings 87 and from the intermediate frame 73 to the openings 100. As shown in Fig. 3, the lower edge of the deflector 90 is secured to the rear flange 21a defining the openings 21 through the horizontal portion of the header 4.

Suitably secured in registration with the openings 21, are vertical tubes 92 (one being shown) which may be suitably carried on the horizontal portion of the front header panel and which may carry therewithin adjustable deflectors 93 to control the direction of air downwardly into the body. The deflectors may be interconnected in any suitable fashion so that all of the deflectors swing together in the manner of the shutters of a hot air register in a building.

Attention is called to the relative position of the injector discharge passages through the front header panel 26 and the ejector inlet openings, those at one end of the panel being indicated at 100 in Fig. 5. By this arrangement the air within the body is changed quickly with practically no possibility that air will merely travel from the openings 88 directly to the openings 100 without aerating the vehicle body. The air injected at the openings 87 is forced rearwardly into the body space centrally thereof and diffuses into the rear passenger space and finally the used air is carried along the ceiling at both sides directly to the respective sets of ejector openings 100. The air received through the openings 21 and tubes 92 is forced rapidly downwardly in the vehicle body forwardly of the front seat passengers to the cowl space and then diffuses and flows rearwardly in the body, finally rising and being drawn into the general air-flow toward the ejector openings and thereby ejected.

Referring now to Fig. 6 this shows a modification of air treatment means principally in that the air treating medium 105 is carried on a movable frame 106 controlled from within the body, say by a suitable control lever 107 on a rock shaft 108. As shown there is no injector "lip" effect as in the previously described arrangements for intercepting a portion of the upwardly rising air stream, but instead the injector inlet opening indicated at 10a faces directly forwardly. Adequate volume of air will be injected however by reason of the extremely high pressure of this upwardly rising stream of air. The opening 10a as shown is protected by suitable grillwork 109 and if desired this may be screened in the plane of the forward surface of the top roof panel 7. Furthermore, the strips illustrated comprising the grillwork 109 may be adjustably positioned so that the opening or openings 10a may be entirely closed and adjustably opened for more or less freely admitting air as desired.

The air filtering body 105, which may comprise treated metal wool or suitable, preferably mineral substance, say granulated carbon or such other media as may be found suitable for filtering and cleaning air, may be inserted into the swinging frame 106 through the opening or openings 10a with the frame swung down part way to slidably receive such body. The two operating positions of the frame 106 are shown. In the position shown in full lines the air filtering body is disposed entirely across the injector duct and the frame 106 may be held in this position by a suitable spring detent 110. This results in filtering and cleaning whatever air enters the injector duct before such air can pass into the vehicle body space generally. The broken line position of the frame 106 and body 105 is such that the injected air passes entirely freely through the injector duct into the body. In other words the air filtering medium which necessarily offers considerable resistance to the passage of air is rendered inoperative for the sake of greater air volume.

Referring now to Fig. 7 this illustrates a third general arrangement of air treatment by suitable media but particularly for diffusing the injected air so as to substantially eliminate all unpleasant drafts which might be present with all the injector control doors or shutters open at the same time. Other portions of the ventilator shown in Fig. 7 are somewhat modified. For example the control doors or shutters (one being shown) are mounted exterior of the injector opening 10b. As shown these doors 120 are hinged as at 121 to a depending flange portion 15b of the divider 15 and the doors swing into spaced relation to the windshield framework as shown in full lines in Fig. 7 to provide for positively deflecting large quantities of air into the injector duct. Suitable guarding screening may be positioned over the injector opening at 122.

The ejector is also modified to the extent that there is shown diagrammatically an ejector duct 130 in the ceiling of the car. It may be understood that this duct may extend any desirable distance along the ceiling and that the duct may either be built into the ceiling structure or formed separately therefrom on the inside of the body. A suitable control for such duct may comprise adjustable doors 131 positioned to close and adjustably regulate suitable openings 132 in the duct. Assuming several of such doors, the air may be ejected from the body at a number of points with relation to the body space generally as may be desired.

The draft diffusing device comprises, as shown, a reticulated air-diffusing body 135 of substantial thickness. This may comprise loosely laminated screens lying within the space 25 between the front header panel 26 and the header member 4. The front header panel 26 may be perforated or otherwise provided with a suitable arrangement of openings as at 136 to allow air received by the injector and passed through the diffusing body to enter the interior of the vehicle body.

To facilitate positioning of the air diffusing body 135 the front header panel may be hinged as at 138 adjacent the upper windshield frame and at its upper edge this panel may be secured in any suitable fashion as by screws to the header structure generally. The manner of securing such upper edge of header panel is not illustrated in Fig. 7, but this may be for example as shown in Fig. 3.

Fig. 8 shows a desirable disposition of openings through the header and also shows a suitable drain duct arrangement. It will be observed in Fig. 9 that the drain duct 46 is out of alignment with the extreme side edge of the door 120 illustrated wherefore this drain duct is out of the free passage for air through the injector tube and will thus not be likely to receive any large volume of injected air.

It is to be understood that all the metal parts of the construction herein described which may come in contact with moist air or water may be of inherently non-corrosive metal or may be suitably rust proofed by any known or suitable methods. Such parts, for example, may be "Parkerized" or suitably coated with waterproof paint or enamel.

Referring to Figs. 10 to 14, these illustrate a preferred form of apparatus forming a complete ventilating system for an automobile e. g. body of the closed type. The structure of the ventilator apparatus in the header portion of the body is very much on the order of the arrangement of Fig. 1 but modified principally to accommodate injector and ejector duct arrangements in substantially the same plane in the roof structure of the body, without impeding the passage of air through the ducts at any point and without adding materially to the cost of the installation or increasing the size of the parts. The duct apparatus, both in the header and upper roof, is so arranged as not to decrease head room or impair the strength of the body. Fig. 10 shows a desirable arrangement of ejector inlet passages and injector outlet passages; in other words, the passages between the various duct arrangements and the interior of the body. As shown, there is a central injector duct formed in the roof structure at 150 and at opposite sides of the injector duct and in the same plane are two ejector ducts 151.

The injector duct 150 may have for effective distribution of air in a sedan type body, a single outlet opening and this is preferably located midway between the front and rear seats so as to distribute fresh air equally to both the front and rear seat passengers at breathing height. The outlet for the duct 150 is indicated at 153 and this may be modified to the extent of providing for directing the injected air specifically toward any part or parts of the body that may require a generous supply of air. Other injector outlets could, of course, be provided in the case of passenger coaches or in general larger bodies.

As shown, each ejector duct 151 has two (forward and rearward) inlet openings from the body to the duct, respectively indicated at 155 and 156. The openings 155 are preferably above the front seat of a sedan type body and the openings 156 above the rear seat so that ejection ventilation is easily obtainable by the individual passengers. These inlets may, of course, be greatly modified and the number of inlets in a given duct reduced or increased in accordance with the size of the body. In addition to the overhead outlets and inlets, provision is made for injecting air into the body directly adjacent the windshield, and outlets for this purpose are provided in the front panel and substantially rigid header member very much as shown for example in Fig. 3, the position of the injector outlet passages in the front header panel being indicated at 157 in Figs. 10 to 13.

Referring in detail to Figs. 11 and 13, it will be noted that the header member 4 has one flanged injector opening 160 therethrough in the generally upright portion 4b thereof and two flanged ejector openings 161 through the same portion. The portion of the header member 4 centrally of the body has a raised steeply inclined surface at 164 for conveying air directly toward the central flanged opening 160. The divider 15 is similarly raised at its central portion, see 165, Figs. 11 and 13, providing a top duct surface generally parallel to the steeply inclined header portion at 164.

The injector inlet passages and inlet passage control doors are preferably arranged essentially the same as in Figs. 1 and 2 and the parts are similarly numbered. There are preferably three injector passages and corresponding doors or shutters and controls therefor, as in Figs. 1 and 2. Also the weatherproofing arrangement is very similar to the arrangement shown in Figs. 1 and 2, a wire screen 30e being positioned forwardly of the trough and contiguous with the free edge thereof to assist in trapping moisture from the air passing through the duct, as previously described.

The trough effect 30 may, as a matter of convenience, be omitted from above the central injector inlet passage for greater freedom of air flow to the overhead duct 150, since the upper and forward portion of the divider 15 and the steeply inclined floor portion 164 of the header will serve as adequate weather-proofing means under any conditions without any such water trap forming trough 30. This is principally because there are no downwardly directed openings in the header opposite the central door or shutter 12, such as provided, for conveying air to the outlet passages 157 in the front header panel. The arrangement of upwardly flanged openings 21 in the generally horizontal portion of the header (one such opening for each of the two extreme injector inlet passages 10, as shown) is substantially the same as in Figs. 1 and 2.

A modification is indicated in Fig. 12 as to the outlet passages 157 in the front header panel. These passages, as shown, are provided with relatively thin screened frames 166, and underhanging these frames are suitable closure members 167 which may be used both for directing the injected air downwardly along the windshield or more generally rearwardly, as desired, and which also may be used in place of the usual glare visors provided on the front header panel. Stated another way—we may use the usual glare visors to close the passages 157 and control the direction of injected air therefrom.

A further modification is shown in Figs. 11, 12, and 13, this being essentially the provision for discharge of water which may enter the hollow header—either at the ejector outlet passages or at the injector inlet passages—in such manner that there will be still less likelihood of accumulated water being picked up by inrushing air and carried into the body. This modification differs essentially from the previously described arrangements in that the accumulated water is discharged at the effective ends of the hollow header and preferably down the hollow front body side posts.

The header member 4, as shown particularly in Fig. 13, curves downwardly at its ends to join or form part of the side post construction. We contemplate such modification of the header member 4 or parts attached thereto as will form adequate discharge trough effects and channels for conveying water and discharging the same downwardly at both sides of the body. To form the trough for conveying all water that may accumulate in the forward portion of the injector duct, a suitable wall may be erected as at 190 behind the injector inlet passage control doors or shutters. Such wall may extend the entire length of the header member 4 and by reason of the fact that it is behind the doors 12, such wall does not in any way cut down the air passage through the duct at the hollow header. Thus where the generally horizontal portion 4c of the header curves downwardly to join or form the side posts, as at 4c', Fig. 13, a convenient water-conveying channel is provided by the cooperative effects of this portion 4c' and downwardly curved portions 4b' as well as downwardly curved portions (not shown) of the wall effect 190. As shown, the divider 15 also extends a sufficient distance over the downwardly extending water discharging channel so that water accumulating on top of the divider 15 may likewise be discharged down the side posts. The trough effects 30 are similarly arranged, as shown in Fig. 13 particularly; these trough effects discharging water through suitable openings 192 at the down-turned ends of the divider member 15, as shown.

Provision for ejecting water from the hollow side posts may comprise simply openings through the sill portions of the chassis (not shown) which the side posts may join in conventional fashion.

The provision of injector and ejector ducts in the roof of the body includes, as shown (see Figs. 11, 12, and 14), an inner roof panel or lining 170. This may be conveniently attached to cross-ribbing 172, which latter may be reinforced where necessary by suitable metal channels or angles 172a. The ribbing 172 bridges the usual heavy upper longitudinal frame members 173 at the sides of the roof structure and which connect the header structure with the rear top structure in conventional fashion. The wooden header member 5 may also be reinforced if necessary in providing adequate duct space as by a suitable channel at 174; it being understood that it is highly desirable not to decrease head room in the body. A single panel 170 may form the upper wall of both the injector and ejector ducts.

Suspended from the header member 5 and the cross-ribbing 172 are a suitable number of longitudinally extending strips 175 which form side walls for the ducts; the outer side walls of the ducts 151, however, being formed by the members 173, as shown. The strips 175 may be of wood and may be screwed to the various cross members above mentioned on the undersides thereof. In contour these strips 175 follow the under surface of the liner 170 and the wooden header 5, and also the rear surfaces of the upright portions 4b of the header member 4. To the underside of the strips 175 is secured a panel 176 (metal or cardboard e. g.) forming the floor of the ducts 150 and 151 and which may extend across all of the strips 175 and underlie the roof members 173, being secured thereto and to the strips 175, as by suitable screws e. g. (not shown). There may be separate panels 176 for each duct. The forward end portions of the panel 176, as shown, extends through the flanged openings 160 and 161 in the header member 4.

The forward end portions of the panel 176 may also be supported by a wooden cross member 178 located between the header member 4 and the front header panel. The member 178 may also support the front header panel 26 and the forward portions of the usual headlining 177.

The outlet openings for the injector duct and the inlet openings for the ejector ducts may be made exactly alike if desired, and may for simplicity comprise suitable frames, such as shown at 180, and sliding plates 181 adapted to close suitable openings in the panel 176, being carried in suitable slideway-forming strips 184 at each side of each sliding plate 181. The sliding plates 181 may be provided with suitable knobs 181a to enable the occupants of the body to control the positions of the plates to admit air or eject air in such volume as the occupants may desire.

The usual headlining 177 for the body may be secured to suitable cross strips 177a on the underside of the panel 176; which cross strips are secured to the latter or to the strips 175 as by screws extending through the panel 176. Any convenient means (not shown) may be used to close the rear ends of the various ducts. For example, suitable filler blocks may be interposed between the two panels 170 and 176.

It is to be understood that where overhead ducts are provided these may be greatly simplified particularly in forming the ejector ducts. The panels 170 and 176 may, for example, be entirely omitted, likewise the controllable openings for admitting air from the body space generally into the hollow roof structure. In such event the headlining (usually cardboard liner and cloth finish covering) serves to admit air from the body to the ejector duct and in the case of using such cardboard liner this may be cut away in various places (not illustrated) the air in such case passing through the cloth subtending such openings. Where both injector and ejector ducts are provided in the roof structure and it is desired to simplify the arrangement the injector duct may comprise simply a channel (not illustrated) flanged upwardly for attachment to the cross-ribbing 172, such channel extending the desired length of the body and being provided with any number of openings that may be desired. It should be mentioned that a larger number of injector outlet openings into the body is desirable to diffuse the injected air and thus eliminate uncomfortable drafts.

In some types of vehicle bodies provision of suitable air ducts for either air injection or air ejection is simply a matter of taking advantage of the channels formed in the body walls in the course of construction of the body, and, when desired or necessary, providing openings and/or suitable regulators or grills at various points adjacent such channels. Some adaptation is, however, usually necessary. An illustration of hollow body walls requiring substantially no change in construction to form convenient air ducts is given in Fig. 15. In many cases the heavy upper longitudinal frame members 173 are spaced a material distance from the planes of the side walls as in Fig. 15 and the provision of inner and outer cover panels 185 and 186 respectively which connect the members 173 with the lintel bars 187 form complete ducts from the header portion of the body to the rear body structure. While usually there are transverse ribs connecting the members 173 with the lintel bars such ribbing is often omitted and in any event may be cut away sufficiently to afford passage for air longitudinally of the body from end to end. As shown the duct afforded as just described includes passages 188' in the longitudinal ribbing 188 to which the usual head-lining 177 is attached. Below this longitudinal ribbing as shown the inner panel 185 may carry any suitable number of adjustable openings and controlling slides, e. g., such as diagrammatically illustrated at 189. Assuming the duct so formed extends forwardly and suitably connects with either the ejector space of the header or injector space of the header, the duct formed by the inner panel 185 and outer panel 186 will function to convey air from the body through the ejector outlets 35 or to convey air from the main injector inlets rearwardly into the body.

If desired both the injector ducts and ejector ducts may extend the entire length of the roof and down the rear wall of the body and suitable openings may be provided in the ducts at such rear wall (not illustrated).

We contemplate the provision of suitable apparatus for either raising or lowering the temperature of air received at the air injector inlet passages or otherwise admitted into the body for heating or cooling the interior of the body, as desired, depending upon weather, etc., conditions. Suitable heating and cooling elements may be located in any of the ducts or passages for air and further such elements may operate on air injected by the relative motion of the vehicle and the outside air in accordance with the disclosures hereof as above described or injected by ancillary apparatus arranged to secure forced passage of air to and past the heating or cooling elements irrespective of whether or not the vehicle is in motion.

Further, we contemplate securing air change for the body (with or without heating or cooling) when there is no relative motion between the body and air outside the body. Further, we contemplate circulating air in the body (substantially in a closed path) to heat or cool the air in the body, adding to the air in the body in sufficient volumes as and if desired to maintain air conditions comfortable to all the occupants of the body. Examples of the contemplated heating and cooling and further air conditioning apparatus are shown in Figs. 12, 13, and 16 to 18, inclusive.

Referring to Fig. 12 this shows in addition to the apparatus above described a temperature varying element at 195. This may be adapted for either heating or cooling. The device 195 may be modified to any extent in accordance with known practices for heating or cooling. For example, the device 195 may consist of electric heating elements or suitable conduits for steam, hot water or hot gases, for heating, or for refrigerating media in accordance with say more or less conventional practice in refrigeration for cooling. For cooling we may use such medium as solid carbon dioxide in suitable containers.

As illustrated in Fig. 12, the apparatus 195 comprises a hollow frame 196 between the header member 4 and front header panel 26, the frame being open above and below to communicate respectively with the injector inlet and outlet passages. The frame may support suitable electric elements (wires e. g.) supplied with current from the usual power plant of the vehicle. At present the electric power supply is probably insufficient in most cases for securing the desired amount of heat electrically, for generally heating the body, but the device using only electric wires as above specified is entirely practical at present for defrosting the windshield. The device is operated for this purpose preferably with the air injector passages only slightly open. As shown in Fig. 12 the air from the heating apparatus may be properly directed for defrosting and/or heating by the member 167 which may be retained in adjusted position as usual, by friction at the pivot mounting 167'. Where more adequate electric current is made available, heating of the interior of the body without essential modification of the illustrated apparatus is entirely practicable.

Referring to Fig. 13 this shows, in addition to the apparatus above described, in detail, a simple manner in which tubes for heating or cooling media (or either, alternatively) may be provided between the relatively rigid header member 4 and the front header panel construction. In Fig. 13 one of a suitable number of such radiator tubes is indicated at 200, this having radiating fins conventionally illustrated at 201. The tubes may be conveniently suspended from the header member 4 on hollow brackets or headers 202. One of the brackets 202 is shown as provided with a feed pipe 203 and a return pipe 204. An advantageous location for such feed and return pipes is in the hollow forward side frame posts which as above described, function as drain channels for water caught by the injector and/or ejector apparatus, it being understood that the apparatus for furnishing heating or cooling media through such pipes would naturally be located at or near the power plant of the vehicle.

Referring now to Figs. 16 and 17, Fig. 16 shows the space between the header member 4 and the front header panel construction considerably enlarged for the reception of adequate air forcing apparatus and/or more adequate heating or cooling elements. The general arrangement of injector or ejector ducts may be substantially in accordance with Figs. 1 and 2, that is to say, there may be three injector inlet passages 10 and corresponding ducts and three sets of ejector outlet passages and corresponding ducts. Roof ducts may also be provided, say in accordance with Figs. 10 to 15. As shown the space between the header member 4 and the front header panel construction is divided into three separate chambers or compartments, the central chamber being formed by a bracket member including end walls 205 and a bottom wall 206 together with the rear interior wall surfaces of the header member 4 and the interior surfaces of the front header panel. This space affords a convenient location for one or more power operated blowers 208, two being shown. The blowers may include electric or other suitable motors 209 with suitable fans and air inlet devices 208a, suitably screened or guarded.

Air may be supplied, from a central injector inlet identical with 10, Fig. 16, to the inlet devices 208a through a suitable opening 20x in the header member 4 located in the transverse plane of the opening 20y, Fig. 16 but not shown in Fig. 16, or, alternatively, may be supplied from the roof duct 150 for circulating air in a substantially closed path in the body as above stated. The blower devices 208 may function simply to convey air into the car through the injector passages when the vehicle is not in motion thus affording facility for air change at all times.

The chambers or compartments at each side of the central chamber afforded by the bracket 205, etc. are shown as adapted to receive suitable heating or cooling elements indicated at 210. The radiation surface of these elements may be supplied with fresh air from outside the car through openings 20y in the header member 4 and air thus supplied flows over the elements 210 and thence into the car through suitable ducts or, for example, through the grill openings 211 in the lower portion of the front header panel. On the other hand the air may be supplied entirely through the openings 20x and by means of the blower forced through openings 208' in the partition 205 past the heating or cooling elements 210 and into the body.

For a still different operation the control shutters opposite the openings 20y may be closed and a suitable shutter 150x, arranged to close the forward end of the duct 150, may be opened at such time to cause the air from the upper region of the body to be withdrawn forwardly through the duct 150 by the blowers for directing such air over the heating or cooling elements and into the body generally in suitable fashion as through the grills 211. The air supply to the blowers may also be augmented by fresh air through the openings 20x in desired volume. With such an arrangement any desired air condition in the body may be obtained so far as temperature and freshness of air is concerned and other desirable air conditioning apparatus such as earlier described may be used with the temperature varying or controlling apparatus to secure clean air at all times. In cold weather the air may be recirculated in the body past the heating elements or cooling elements as much as desired without supplying new air as through the injector apparatus, thus greatly adding to the efficiency of the temperature control devices. Under ordinary conditions the blowers are required to augment the ventilator apparatus as such, only when the vehicle is not in motion.

Referring to Fig. 18 this shows a convenient arrangement for cooling air in the vehicle body without requiring a refrigeration system. The ventilator parts are substantially the same as the corresponding parts of Fig. 16. A cartridge or drum 220, say for solid carbon dioxide, is shown as adapted to be slid into place through a door 226 in the front header panel, onto suitable supporting bracket members 221, one being shown, carried on the header member 4. The door is shown as hinged at 227 and may have any suitable catch arrangement (not shown) to retain the door closed. The drum has radiating fins at 222, and handles 223, and suitable detent arrangements 224 are shown on the brackets 221 for holding the drums in place. Where it is desired to carry gases from the drum, directly to the outside air, suitable piping for this indicated diagrammatically at 225 may lead into the ejector duct space above the header member 4. Such drums or cartridges 220 may be conveniently stored and supplied by gas service stations, as required.

It is to be understood that each embodiment herein shown may be modified to include the features shown in the other illustrated embodiments.

From the above description it will be seen that we have provided ventilator and air conditioning apparatus for vehicle bodies which will function properly to maintain air circulation and adequately supply clean, dry and heated or cooled air to the occupants of such bodies to insure complete comfort under all weather conditions that may be expected to arise. Further, we have provided a ventilator by the use of which all the occupants of a vehicle body may have under individual control an adequate supply of fresh air without unpleasant drafts and likewise control of the ejection of air for removal of smoke e. g. or stale air from the body space.

Further, we have provided various effective arrangements for cleaning the injected air of foreign material including, if desired, smoke and other noxious and unpleasant fumes. Further, we have provided means under the control of the operator or passenger to enable selectively using air cleaning media or rendering such media inoperative at times to provide greater air volume in warm weather or under whatever conditions increased air flow may be desired. Further, we have provided an efficient all-weather injector and/or ejector ventilator which enhances the appearance of a vehicle body on which it is used rather than detracts from the beauty thereof as with most effective vehicle body ventilator arrangements. Further, we have utilized to good advantage the necessary structural parts of the body framework in providing efficient ventilator arangements, thus greatly reducing the installation cost. Further, we have provided for both injecting fresh, clean air heated or cooled or at normal temperatures into the body and ejecting stale air therefrom in such manner that during all kinds of weather the air in the body may be changed sufficiently rapidly or heated or cooled in such manner as to insure complete comfort to all the occupants of the body.

Further, we have provided convenient and practicable arrangements for forcibly conveying air in the vehicle body either with or without heating or cooling elements irrespective of the motion of the vehicle, in other words, we have provided for adequate ventilation and air change together with heating or cooling air in the body when the body is at a standstill.

Having thus described our invention, we claim:

1. In an automobile body of the closed type, a front wall including a transparent windshield, and a top wall, a relatively heavy sheet metal header member extending from the said front wall to the said top wall and forming the main connecting brace therebetween, means cooperating with the header member to form therewith an injector duct, means providing an injector inlet passage for diverting air passing upwardly from the outer windshield surface into said duct, said header member having an opening therethrough, and a substantially continuous flange about said opening for preserving the strength of the header member while affording an outlet for air from said duct to the interior of the body through the header member.

2. Apparatus according to claim 1 wherein the opening is located in a generally horizontally extending portion of the header member and the flange extends upwardly therefrom about the opening preventing water from flowing from the upper surface of said portion through the opening.

3. In a vehicle body of the closed type, a front vehicle body wall structure and a top vehicle body wall structure, a hollow header connecting said structures and forming an air injector duct, air injector inlet means in said hollow header communicating with the duct, a shutter movably mounted within the duct and arranged to seal said inlet in one position and to guide the injected air upwardly within said hollow header in another position, means in the hollow header to receive said upwardly guided air and deflect the same downwardly behind the shutter, the hollow header having an inclined inner and bottom surface located behind the shutter and on which moisture suspended in the air is deposited when deflected downwardly as aforesaid, means for discharging water exteriorly of the body from said inclined surface and means including an air outlet passage rearwardly from said moisture receiving surface for discharging the injected air into the general interior of the body.

4. In a vehicle body, a front vehicle body wall, an injector inlet passage therethrough, inner walls forming an injector duct communicating with said passage, a portion of the duct being arranged to convey air received at said passage in a downward direction rearwardly from said passage, a trough forming a water trap, said trough being located adjacent a rearwardly disposed wall of the duct past which the injected air is constrained to flow downwardly as aforesaid, said trough extending laterally of the vehicle body and adapted to drain water from said duct.

5. In a vehicle body of the closed type, said body having a front wall structure including a transparent windshield and a top wall structure, a header member rigidly connecting said structures and extending substantially across the body, an outer cover panel extending from said front wall structure in outwardly spaced relation to the header member and joining said top wall structure, means providing an injector inlet passage leading into the space between the outer cover panel and header member, said means being arranged to intercept the relatively onrushing air stream passing over the windshield and to divert air therefrom into said space, an ejector outlet passage in said outer cover panel disposed in a plane above said injector means, dividing means extending transversely of the vehicle body and into substantially continuous contact with both the header member and outer cover panel and dividing the said space into discommunicated injector and ejector ducts, and openings through said header member communicating respectively with said ducts to communicate the interior of the vehicle body respectively therewith.

6. In a vehicle body having a front wall and a top wall extending rearwardly therefrom, whereby on forward movement of the vehicle a relatively onrushing air stream impinges on said front wall and is deflected upwardly thereby past the upward limit of the front wall and thence over the top wall and forms a low air pressure area directly behind the upper limit of said front wall, air injecting means having an injector inlet passage for intercepting part of said onrushing air stream, a duct communicating said passage with the interior of the body, air ejecting means having an air ejector outlet passage at said low air pressure area, said passages being disposed in a common vertical plane extending longitudinally of said vehicle body, and a duct communicating the interior of the vehicle body with said ejector passage, said ducts being discommunicated and also lying in the aforesaid common vertical plane of said passages, whereby the same portion of the air stream that effects injection may be substantially simultaneously rendered effective for ejecting air from the vehicle body.

7. In an automobile body of the closed type, said body having a front wall, a top wall extending rearwardly therefrom, said front wall including a transparent windshield, an injector inlet passage in one of said walls above the windshield, an ejector outlet passage in one of said walls above the injector passage, a hollow header structure connecting the top wall with said front wall, and partition means in said hollow structure and forming therewith separate superposed discommunicated injector and ejector ducts to respectively convey air from said injector passage to the interior of the body and from the interior of the body to the ejector passage.

8. A vehicle body including a transverse header member and front and top wall structures joined by said header member, an outer wall cover member also joining the front and top wall structures and forming with the header a chamber, means extending substantially horizontally of the chamber and dividing the same into injector and ejector ducts, an injector inlet passage in a forward wall of said chamber communicating with the injector duct, an ejector outlet passage in said outer wall member communicating with the ejector duct, the said means forming with the header a water trough, and means disposed at one end of said trough for draining water from said trough.

9. In a vehicle body of the closed type, a front wall structure including transversely spaced side body frame members and an upright transparent windshield extending transversely of the body intermediate said side frame members, said windshield having its forwardly facing surface set back with relation to the foremost surfaces of the upright frame members to provide in cooperation with the side frame members an upwardly extending air stream guiding channel and air injector means having an inlet opening communicating with said channel above the windshield rearwardly of the plane defined by the forward surfaces of the side frame members for guiding air from said stream into the interior of the body.

10. In a vehicle body of the closed type, a front wall structure including transversely spaced upright side frame body members and an upright transparent windshield extending transversely of the body intermediate said side frame members, said windshield having its forwardly facing surface set back with relation to the foremost surfaces of the upright frame members to provide in cooperation with the side frame members an upwardly extending air stream guiding channel and air inlet means having an opening disposed in alignment with said channel and positioned above the windshield between respective planes of the windshield and forward surfaces of the side frame members for diverting air from the channel into the interior of the body.

WILLIAM LINTERN.
ALFRED R. LINTERN.